US010024168B2

(12) United States Patent
Kittel

(10) Patent No.: US 10,024,168 B2
(45) Date of Patent: Jul. 17, 2018

(54) CROSS FLOW TURBINE WITH STRAIGHT VERTICAL AND HELICAL SLANTED BLADES

(71) Applicant: Axis Energy Group Pty Ltd, Southport, QLD (AU)

(72) Inventor: Peter John Kittel, Bonogin (AU)

(73) Assignee: Axis Energy Group PTY LTD, Southport QLD (AU)

( * ) Notice: Subject to any disclaimer, the term of this patent is extended or adjusted under 35 U.S.C. 154(b) by 486 days.

(21) Appl. No.: 14/382,838

(22) PCT Filed: Mar. 6, 2013

(86) PCT No.: PCT/AU2013/000214
§ 371 (c)(1),
(2) Date: Sep. 4, 2014

(87) PCT Pub. No.: WO2013/131137
PCT Pub. Date: Sep. 12, 2013

(65) Prior Publication Data
US 2015/0037153 A1    Feb. 5, 2015

(30) Foreign Application Priority Data

Mar. 6, 2012   (AU) ................................ 2012900865
Mar. 19, 2012  (AU) ................................ 2012901102

(51) Int. Cl.
*F01D 5/16*   (2006.01)
*F03D 1/06*   (2006.01)
*F01D 1/20*   (2006.01)
*F03B 3/12*   (2006.01)
(Continued)

(52) U.S. Cl.
CPC ................ *F01D 5/16* (2013.01); *F01D 1/20* (2013.01); *F03B 3/12* (2013.01); *F03B 3/121* (2013.01);
(Continued)

(58) Field of Classification Search
CPC ...... F01D 5/16; F01D 1/20; F03B 3/12; F03B 3/121; F03D 1/025; F03D 1/04;
(Continued)

(56) References Cited

U.S. PATENT DOCUMENTS 4,236,866 A  *  12/1980  Zapata Martinez ...... F03D 3/02
                                              415/2.1
7,132,760 B2 *  11/2006  Becker .................... F03D 3/002
                                              290/44
(Continued)

FOREIGN PATENT DOCUMENTS

EP       2314867      4/2011
KR       100944239    2/2010
(Continued)

OTHER PUBLICATIONS

"Airfoil", Feb. 15, 2012, Wikipedia, pp. 1-7, https://web.archive.org/web/20120215212452/https://en.wikipedia.org/wiki/Airfoil.*
(Continued)

*Primary Examiner* — Jason Shanske
*Assistant Examiner* — Alexander White
(74) *Attorney, Agent, or Firm* — Stephen T. Scherrer; Monique A. Morneault; Scherrer Patent & Trademark Law, P.C.

(57) ABSTRACT

A structural duct apparatus includes a cross flow turbine for use in a fluid flow. The turbine has at least one straight vertical aerofoil blade and at least one helical aerofoil blade slanted toward the direction of rotation. Inner and outer walls of the duct apparatus provide an inner diffuser flow passageway that houses turbine power take off modules with the outer surfaces of the duct influencing flow direction so that where there are at least two ducts an open flow barrage is advantageously formed.

9 Claims, 18 Drawing Sheets

(51) Int. Cl.
  *F03D 1/02* (2006.01)
  *F03D 1/04* (2006.01)
  *F03D 3/06* (2006.01)
(52) U.S. Cl.
  CPC ............... *F03D 1/025* (2013.01); *F03D 1/04* (2013.01); *F03D 1/0675* (2013.01); *F03D 3/06* (2013.01); *F05B 2240/211* (2013.01); *F05B 2240/244* (2013.01); *F05B 2240/30* (2013.01); *F05B 2240/97* (2013.01); *F05B 2250/25* (2013.01); *Y02B 10/30* (2013.01); *Y02E 10/223* (2013.01); *Y02E 10/28* (2013.01); *Y02E 10/38* (2013.01); *Y02E 10/721* (2013.01); *Y02E 10/74* (2013.01)
(58) Field of Classification Search
  CPC ........ F03D 1/0675; F03D 3/04; F03D 3/0427; F03D 3/0445; F03D 3/06; F03D 3/061; F03D 3/062; F05B 2240/211; F05B 2240/217; F05B 2240/244; F05B 2240/30; F05B 2240/97; F05B 2250/25
  USPC ........... 416/176, 177; 415/71, 72, 73, 74, 75
  See application file for complete search history.

(56) References Cited

U.S. PATENT DOCUMENTS

| | | | |
|---|---|---|---|
| 2010/0090466 A1* | 4/2010 | Lyatkher | F03B 13/264 290/54 |
| 2010/0140947 A1 | 6/2010 | McEntee et al. | |
| 2010/0278653 A1 | 11/2010 | Sassow | |
| 2011/0250069 A1* | 10/2011 | Quintal | F03D 3/002 416/111 |
| 2012/0282092 A1* | 11/2012 | Swist | F03D 1/025 416/1 |

FOREIGN PATENT DOCUMENTS

| | | |
|---|---|---|
| SU | 1150395 | 4/1985 |
| WO | 2011094912 | 8/2011 |

OTHER PUBLICATIONS

European search report for corresponding European application dated May 26, 2015.

* cited by examiner

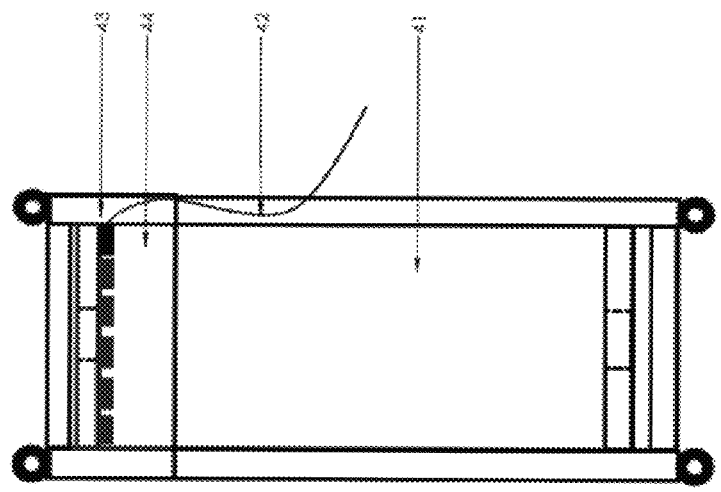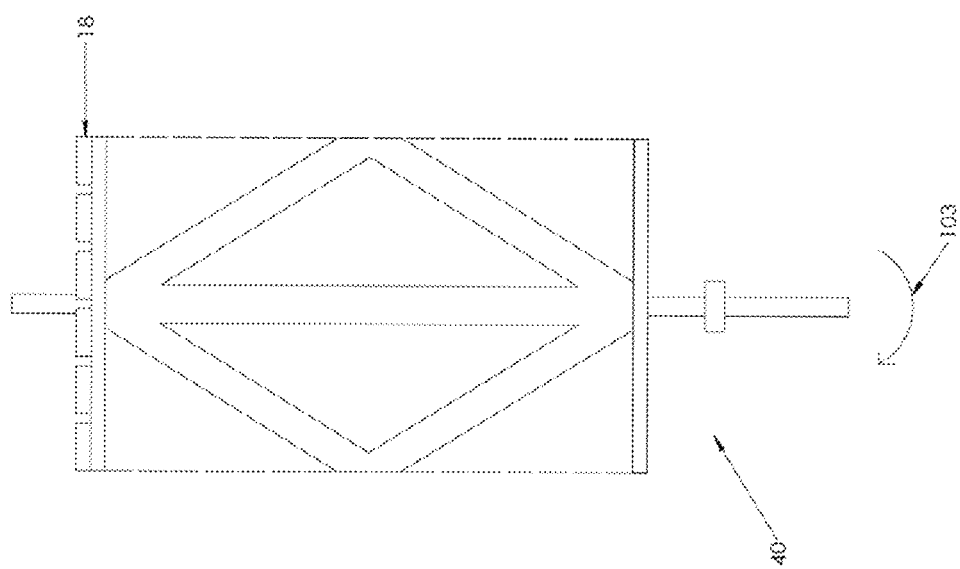
Fig. 6

CROSS FLOW TURBINE WITH STRAIGHT VERTICAL AND HELICAL SLANTED BLADES

TECHNICAL FIELD

The present invention is directed to improvements to turbines to extract energy from fluid flows, and is particularly directed to turbines which can be used underwater to extract energy from flowing water, and on land to extract energy from wind power.

BACKGROUND

Any references to methods, apparatus or documents of the prior art are not to be taken as constituting any evidence or admission that they formed, or form part of the common general knowledge.

The use of turbines/generators for extracting energy from marine flows is an industry that, unlike other renewable energies, has no proven or preferred technology. The first generation horizontal marine turbines were similar to wind turbines and were submerged within ocean or river flows. FIG. 12 illustrates this type of turbine. However, the transitioning of such windmill like devices from surface to subsea environment where the fluid density is more than 830 times greater presents ongoing difficulties including high manufacture, installation and maintenance costs which make it difficult to make the technology commercially viable.

Extraction of commercial volume marine energy requires large sized devices to sweep large areas of flow. High engineering costs are incurred as rotors are fabricated in expensive high strength composite fibre materials that are subject to axial forces acting on rotors that are typically 18 meters in diameter. A one megawatt device costs approximately $US10 million. Devices are also normally built on monopole or other foundations on the ocean floor and are therefore limited to operation on the ocean floor.

An improved marine turbine is the unidirectional cross flow turbine which offers better solutions in extracting energy from fluid flows. An example is the "Darrieus" cross flow turbine which has 2, 3, 4 or more vertical straight hydrofoil blades and is a known technology that is suitable for the marine environment. However, this type of turbine has disadvantages. One disadvantage with the turbine is that it is not self-starting. Another disadvantage is that the turbine has fluctuations in torque and can be prone to blade deflection and shaking.

To overcome some of these disadvantages, a new type of turbine was developed which is known as the "Gorlov Helical Turbine". This turbine discarded the vertical straight turbine blades and instead uses helical aerofoil blades. This turbine has disadvantages in that the helical blades that are, connected by struts or other means to a rotatable shaft have been found to deflect, shake, fail or at least operate inefficiently in flows. FIG. 11 illustrates this type of turbine.

Another disadvantage with marine turbines is the general inability to smooth out torque fluctuations which reduces efficiency.

Another disadvantage with marine turbines is in the power take off components that convert the rotational motion of the turbine to electric power. Existing power take off modules are normally separate from the turbine.

Another disadvantage with marine turbines is high cost and manufacturing complexity in making a turbine that can withstand the axial forces encountered in water flow.

Another disadvantage with existing horizontal and cross flow turbines is in the complexity and cost to manufacture the blades.

Another disadvantage with existing horizontal and cross flow turbines for use in a marine environment is that the turbine has a central shaft which can be a flow obstruction that can decrease turbine efficiency.

Another disadvantage with marine turbines is that existing horizontal and cross flow turbines can fail in marine trials due to the harsh marine environment.

Another disadvantage with marine turbines is the difficulty in installing the turbine in position and removal of the turbine for inspection, maintenance or repair.

Another disadvantage with marine turbines is in providing a structural duct apparatus for the turbine.

Another disadvantage with marine turbines is in providing an array of turbines in such a manner that the structural duct apparatus of one turbine assists in channeling higher velocity water to an adjacent turbine.

The United Kingdom Carbon Trust (the Trust) reports that the next generation of marine energy extraction devices must demonstrate survivability in hostile marine environments and preferably have an operational capability from sea floor to sea surface within a depth range of up to 60 meters. The Trust further stated that for the industry to be successful capital, installation and operational costs must be dramatically reduced so that power supply is commercially viable.

It is an object of the present invention to provide an apparatus or method for extracting energy from a fluid flow and which may overcome at least one or more of the abovementioned disadvantages or which provides a commercial choice in the marketplace.

SUMMARY OF THE INVENTION

According to a first aspect of the present invention there is provided a cross flow turbine for use in a fluid flow, comprising at least one straight vertical aerofoil blade and at least one helical aerofoil blade slanted toward the direction of rotation.

Suitably, the turbine further comprises at least one helical blade slanted away from a turbine rotation direction.

According to a second aspect of the present invention there is provided a cross flow turbine for use in a fluid flow comprising at least one helical aerofoil blade slanted toward and at least one helical blade slanted away from the turbine rotation direction.

In this second aspect of the invention the vertical blades may be omitted. A non-limiting example is illustrated in FIG. 4.

Suitably, the turbine further includes top and bottom rim bands.

The turbine may include a central rotatable drive shaft. A non-limiting example is illustrated in FIG. 1.

Suitably, a plurality of said cross flow turbines are operatively associated with a common drive shaft, or operatively associated drive shafts, that is/are associated to a power take off or other means of energy extraction. A non-limiting example is illustrated in FIG. 5.

Alternatively, the turbine does not contain a central drive shaft and may instead comprise external shafts. A non-limiting example of external shafts is illustrated in FIG. 2.

Suitably, the turbine comprises an apparatus which includes a housing module, part of the turbine comprising a rotor and part of the housing module comprising a stator such that the power take off comprises part of the apparatus. A non-limiting example is illustrated in FIG. 6.

Suitably, a structural duct apparatus is provided in which the turbine can be housed. The apparatus may comprise inner and outer walls to provide an inner diffuser flow passageway that can house turbine power take off modules with the outer surfaces of the duct influencing flow direction so that where there are at least two ducts an open flow barrage is advantageously formed. The spaces between the inner and outer duct walls may form ballast compartments.

Preferably the duct apparatus further includes rectangular plates joining rear ends of said duct walls and protruding into flow at the sides of the duct to assist in lowering pressure behind the turbine for enhanced performance.

Suitably, the duct apparatus comprises part of an array or barrage.

The array may comprise a floating array, a non-limiting example of which is illustrated in FIG. 25.

The fluid flow may be air or water and, in preferred embodiments of the invention, the turbine may be used underwater with the fluid flow being water flow.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 6. Illustrates a turbine apparatus comprising a rotor and stator assembly as part of the apparatus.

DETAILED DESCRIPTION OF PREFERRED EMBODIMENTS

Figure 1:
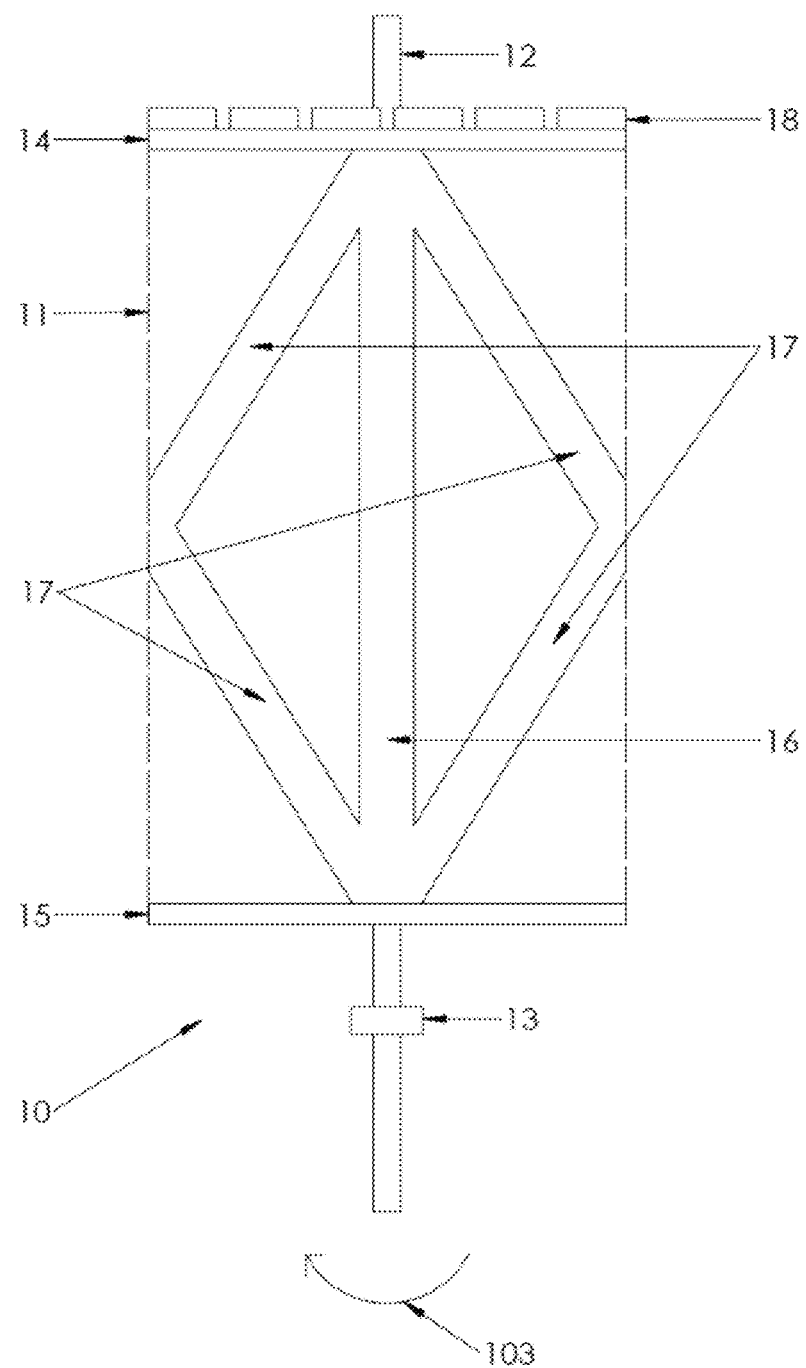
FIG. 1. Illustrates a cross flow turbine rotor having helical and vertical straight aerofoil blades.

Referring now to FIG. 1, there is illustrated part of a cross flow turbine 10, and particularly illustrating the turbine rotor 11. Rotor 11 comprises a central shaft 12 which is supported for rotation by bearings 13. The rotor 11 comprises an upper top rim band 14, and a lower base rim band 15. Permanent magnets 18 are attached to the top rim band 14. The reason for these will be described in greater detail below. The rotor 11 further comprises straight vertical aerofoil blades 16 and also comprises helical aerofoil blades 17. The rotor therefore comprises a combination of vertical blades 16 and helical blades 17.

The size of rotor 11 can vary to suit the size of the turbine that is required. As a nonlimiting example, it is envisaged that the blades 16 may have a length of between 40 cm in respect of a small turbine up to 2 m or more in respect of a larger higher powered turbine. It is also envisaged that the blades may have a width of between 2-40 cm although this can vary to suit.

This turbine extracts energy from fluid flows such as air and water and is suitable for operation on land or operates submerged in rivers, oceans or other man made flows. The apparatus operates with or without shrouds.

The plurality of helical and vertical aerofoil foil blades (17, 16) with top and base rim bands (14, 15) provides greater rigidity and strength than helical or vertical blades alone.

The combination of helical and vertical aerofoil blades (17, 16) also limits shaking during operation and assists in self-starting the apparatus and smoothing out torque to provide an efficient turbine.

Additional structural strength is achieved by incorporating struts or circumferential end plates fixed to the top and base rim bands that are joined to the axis that is fixed to a central rotational shaft 12. Fluid flows impacting the aerofoil turbine blades cause the cross flow turbine to rotate in the one direction around the shaft irrespective of flow direction.

The turbine is fitted with permanent magnets 18 so that it is the rotor component of the power take-off module. The take-off module housing incorporates the stator component of the electricity generator, and this will be described in greater detail below.

Alternatively the turbine is connected to an external power take off or pump.

The turbine is preferably manufactured as a strong lightweight device using materials such as plastics, composite fibres and or metals or other suitable materials to form a high strength rigid structure capable of withstanding axial forces encountered in fluid flows.

The turbine is fitted with bearings 13 and gearing (not illustrated) as required and supplies power to a grid or other end user by known suitable means. The apparatus is finished in a suitable protective marine coating and is fitted with suitable debris and marine life protection screens.

Figure 2:
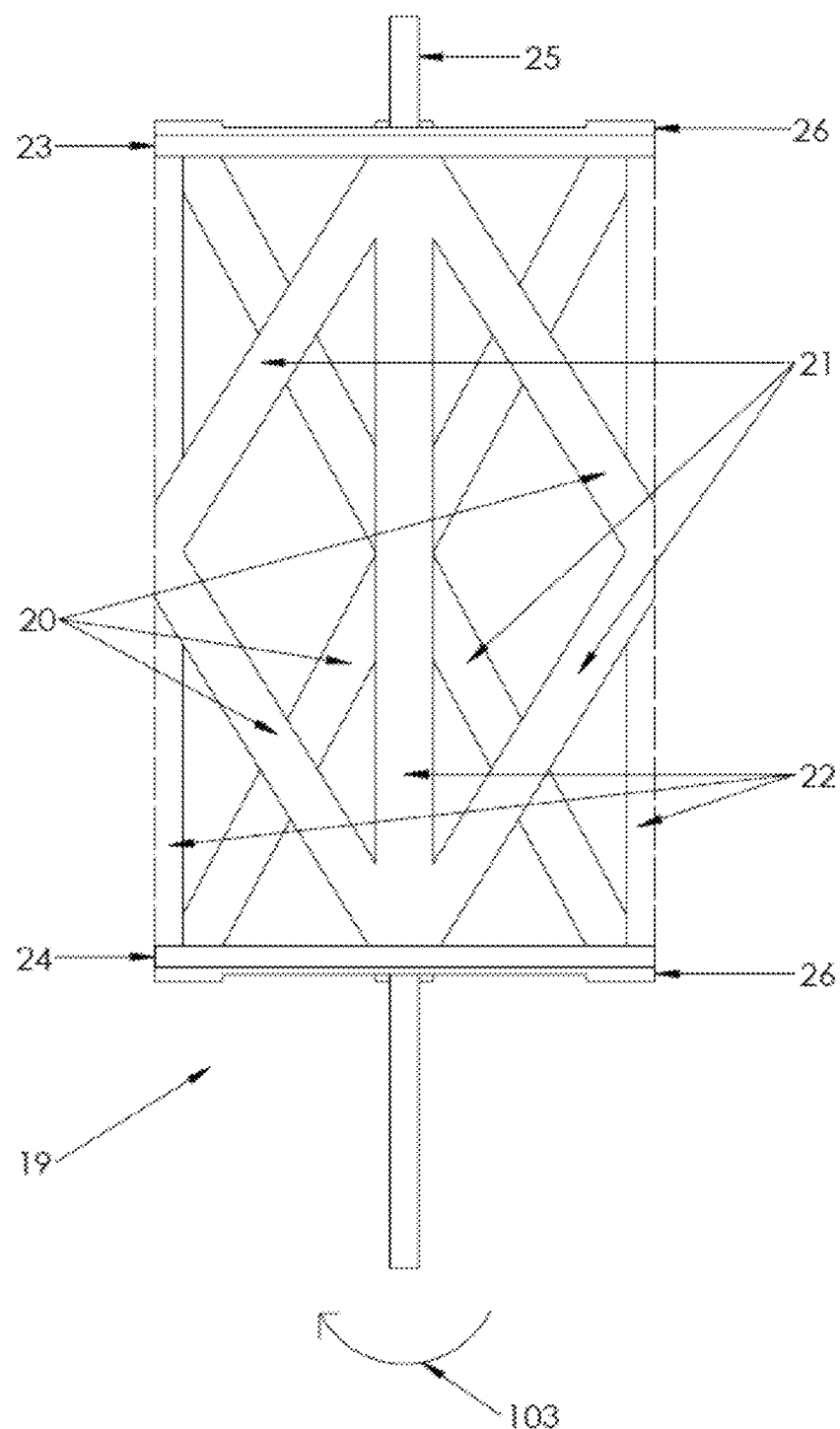
FIG. 2. Illustrates a cross section of a turbine with vertical and slanting aerofoil blades.

FIG. 2 illustrates a cross flow turbine 19 which has at least one helical aerofoil blade 20 slanted toward the direction of rotation and at least one helical blade 21 slanted away from turbine rotation direction. Both forward and rearward inclined helical blades transect the vertical aerofoil blades 22 and each other and are joined at the top and base rim bands 23, 24 that are fitted with struts or circumferential end plates 26.

The turbine is similar to a truss configuration in that the blades act like chords of a truss that strengthen the cylindrical structure. All aerofoil blades face the one direction with a rounded leading edge that faces the proposed direction of rotation.

The aerofoil blade always rotates in the one direction that is determined by the position of the rounded leading edge of the aerofoil that provides lift. A trailing narrow edge reduces drag.

In fluid flows, the turbine has a greater number of blades engaged in work providing greater torque than is available with existing same sized energy extraction devices. The front blades are engaged in work and the spacing between the blades is sufficient to allow flows to reach the downstream blades so that those blades are also engaged in work. The number of blades and the solidity of the apparatus can be altered to suit particular site conditions.

A further difference in this embodiment of the invention is that the turbine does not contain a central shaft. The central shaft typically used in cross flow turbines is a flow obstruction that decreases turbine efficiency. The turbine provides options of using external shafts 25 suitably connected to the top and base plates 26 or end struts of the turbine.

Figure 3:
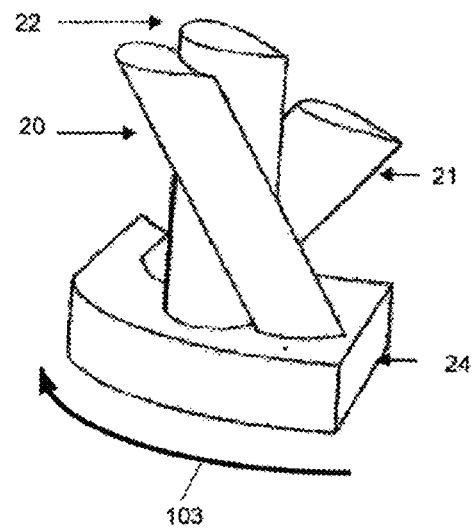
FIG. 3. Illustrates cross sectional detail of vertical and forwardly and rearwardly inclined helical aerofoil blades at the rim base.

FIG. 3 illustrates the cross sectional detail of vertical 22 and inclined 20, 21 helical aerofoil blades at the rim base 24. The blades transect each other at various points providing greater rigidity and strength. The aerofoil orientation depicted causes the turbine to rotate in a clockwise direction, indicated by arrow 103, irrespective of the direction of flow. In particular, aerofoil 20 is inclined toward the rotation direction whereas aerofoil 21 is slanted away from the rotation direction.

Figure 4:
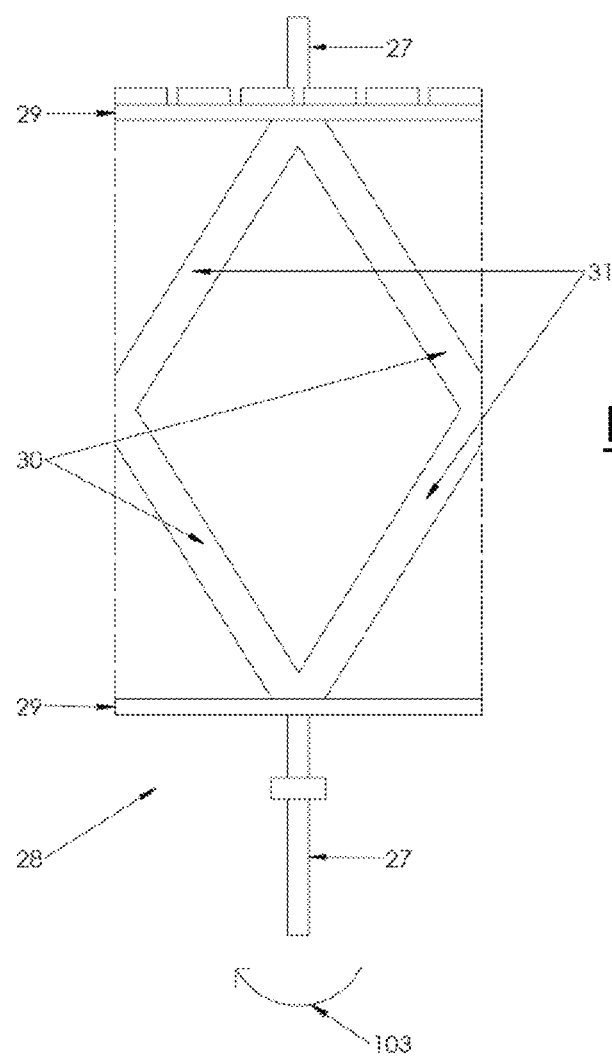
FIG. 4. Illustrates a turbine which does not contain a central rotating drive shaft.

FIG. 4 illustrates a further embodiment of the invention which comprises a cross flow turbine having helical aerofoil blades but not having any vertical blades.

Turbine 28 comprises top and bottom rim bands 29 with at least one helical aerofoil blade 30 slanted toward and at least one helical blade 31 slanted away from the turbine rotation direction and top and base shafts 27.

This turbine is similar to that described above except that it does not have vertical aerofoil blades.

The pluralities of helical blades without the influence of vertical aerofoils may require stiffening rings or plates (not shown) which may be included if required for higher velocity flow sites.

The pluralities of helical blades may be increased or reduced depending on torque or rotation velocity required. The blade configuration is advantageously designed to suit site conditions.

Figure 5:
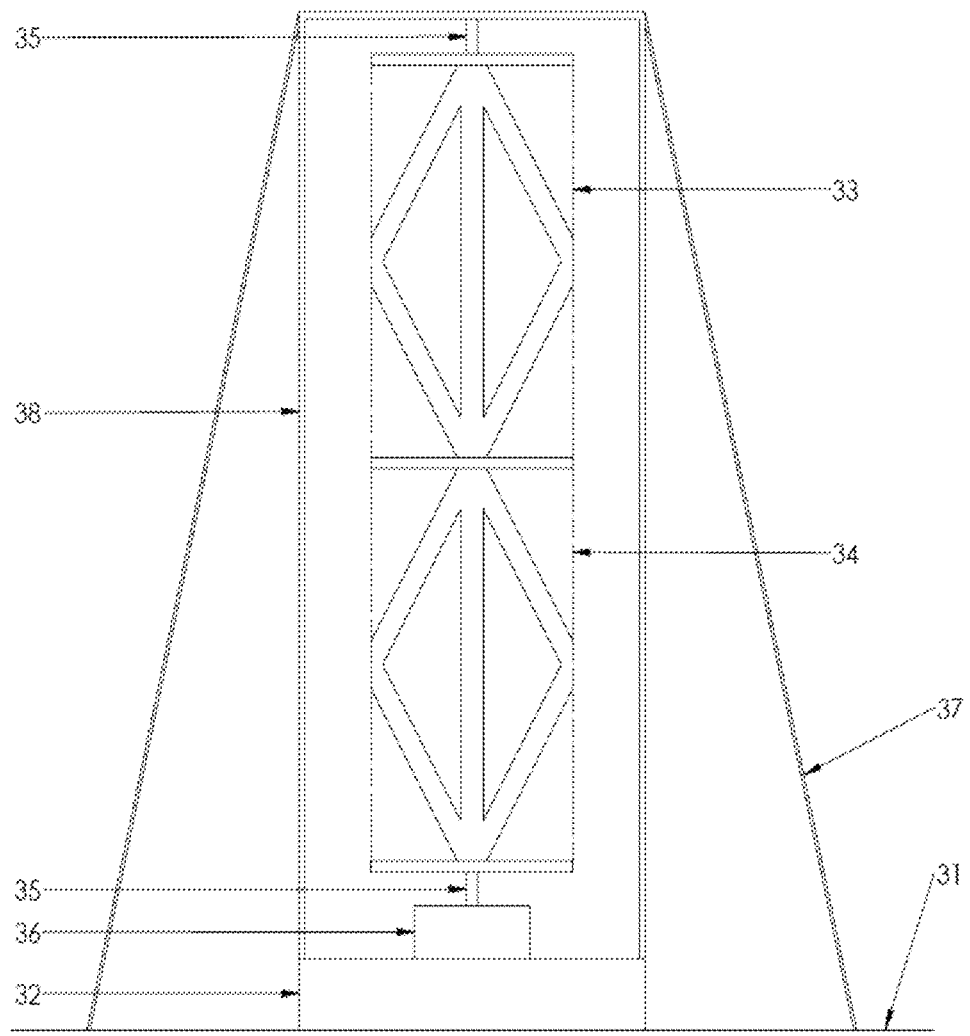
FIG. 5. Illustrates a stackable module of turbines on a common drive shaft.

Referring to FIG. 5, there is illustrated a stack (in this case a stack of two) turbine modules 33, 34 connected to a single central drive shaft 35 that is connected to a power takeoff 36 or other suitable means of energy extraction. The stack rests on a foundation 32 which in turn is installed on surface 31.

The stackable cross flow turbine modules 33, 34 are aligned to a common continuing helical blade position and are then suitably joined at the base of module one to the top of module 2.

Pluralities of modules are joined in this manner and are fixed to a central shaft 35. Flows drive the turbine modules that rotate the central shaft that is connected to a power take off 36.

The modules can be held within a module housing 38.

The stackable modules function efficiently in the vertical and horizontal planes and operate with or without shrouds and are advantageously joined side by side to create an open flow barrage. In marine applications the stacked modules are suitably housed beneath the surface and moored by known means. On land the stacked modules unlike existing axial flow wind generators require minimal foundations and can be anchored using low cost guy wire ropes 37

The housing is advantageously fitted with pivot connections at its base by known suitable means so that the housing and the turbine can be raised or lowered as required.

FIGS. 6-10 illustrate a turbine assembly containing an integrated power takeoff module of particular design. Specifically, the turbine assembly has the turbine comprising the rotor and the housing module comprising the stator of the power takeoff. That is, an entirely separate power takeoff module is not required.

The cross flow turbine 40 rotates within a power takeoff module 41 and electricity is transmitted through the power transmission cable 42. Turbine 40 contains fixed magnets 18, and therefore can function as a rotor. An upper part of power takeoff module 41 comprises the coils or primary windings 43 and therefore can function as the stator. When the turbine 40 is fitted within module 41, the magnets 18 and the stator coils 43 are partially enclosed within a housing cowling 44 that prevents rotor magnets 18 and stator coils 43 from flooding when module 41 is submersed in fluid.

The cover plate (cowling 44) is open ended so that it entraps air when the module is submersed in water or other fluids thereby ensuring that the power generator efficiency is not reduced due to friction caused by the presence of water. Prevention of flooding the rotor magnets and stator coils limits drag and therefore increases the efficiency of the generator and assists in buoyancy of the apparatus.

The cowling 44 acts in a similar fashion to a diving bell. Air entrapped within the generator cover may be regulated with the use of inlet/outlet valves (not illustrated) that may be connected to an external source of supply such as an air compressor.

Known sealed vessel heat transfer fluid systems (not illustrated) are incorporated within the generator cover to reduce heat generation caused by the rotation of the turbine as required.

The turbine power take off module can operated as an unshrouded apparatus or can be incorporated within a duct. It can be a neutrally buoyant structure or can be attached to a vessel tethered to a mooring, or can be attached to a gravity weighted foundation or other known support means.

Figure 7:
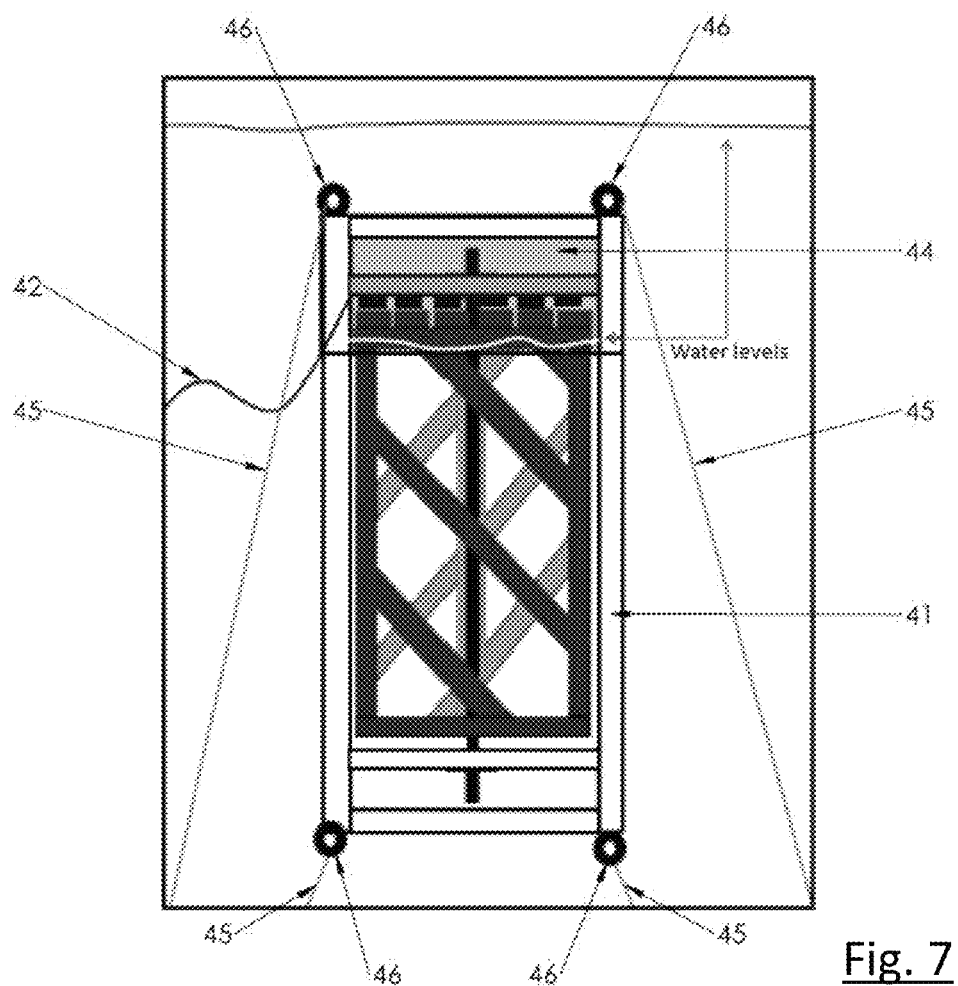
FIG. 7. Illustrates a submerged turbine power take off module.

FIG. 7 illustrates the assembled turbine rotor 40 and power takeoff module 41 in a submerged environment. The apparatus can be tethered at a desirable position by cables 45 attached to eyelets or similar attachments 46 on the module 41. The air entrapped within cowling 44 can provide buoyancy to the apparatus.

Figure 8:
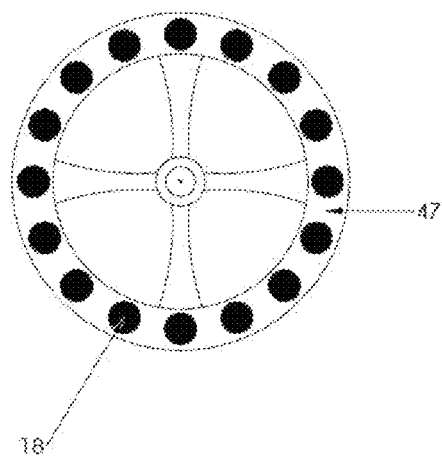
FIG. 8. Illustrates a top view of a turbine rotor rim containing permanent magnets.

FIG. 8 illustrates a top view of the turbine rotor rim of FIG. 6 and particularly illustrates the permanent magnets 18 attached to the rotor rim 47.

Figure 9:
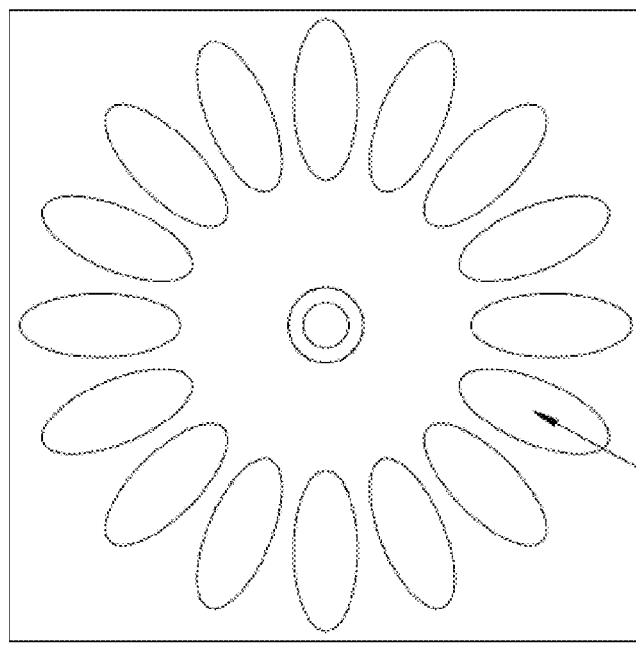
FIG. 9. Illustrates a top view of a stator coil plate.

FIG. 9 illustrates a top view of windings/coils 43 which are supported by a stator coil plate 48.

Figure 10:
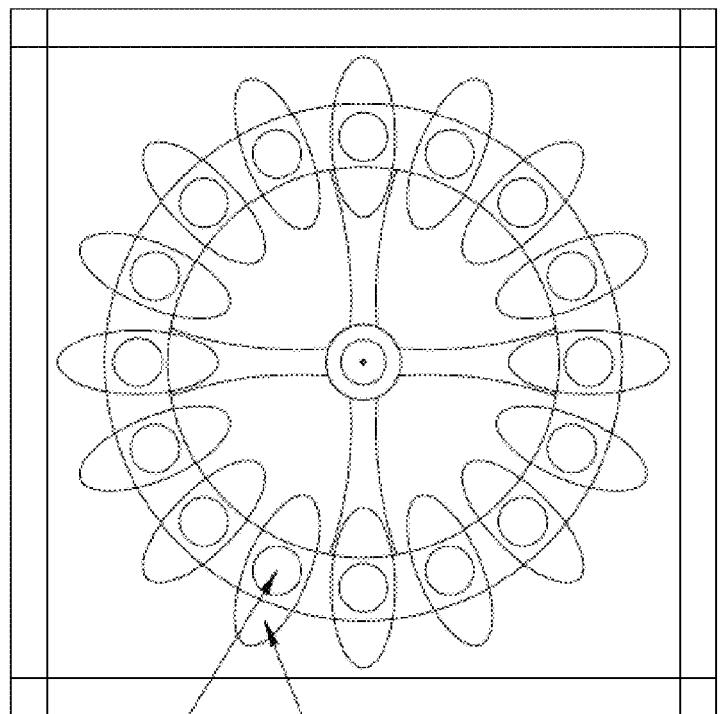
FIG. 10. Illustrates a top assembled view of the rotor rim and the stator coil plate.
Figure 11:
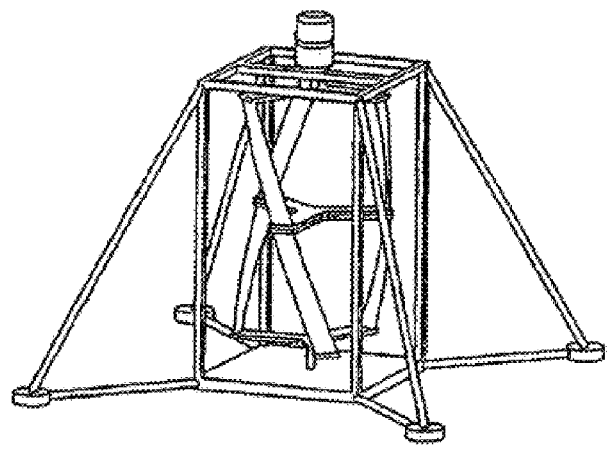
FIG. 11. Illustrates a PRIOR ART Gorlov helical turbine
Figure 12:
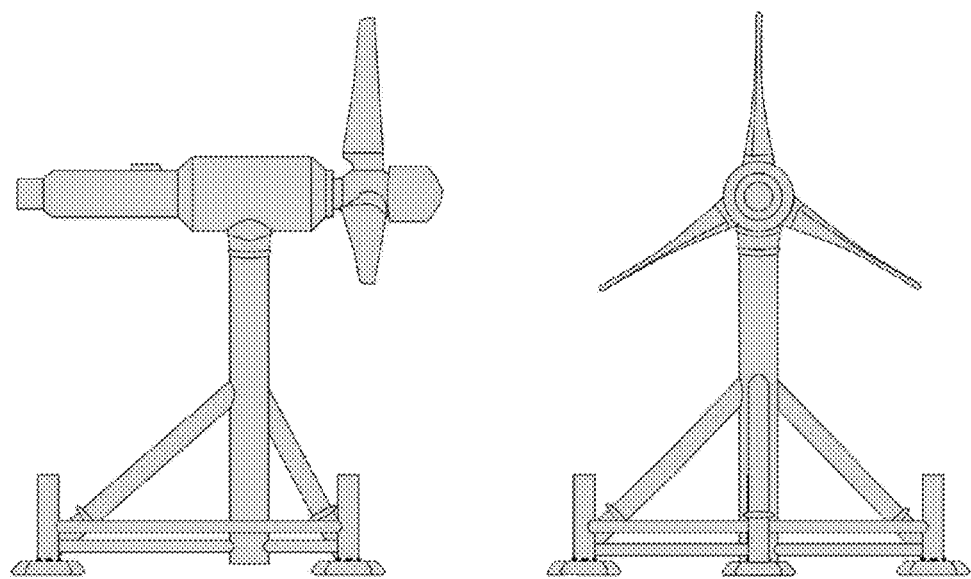
FIG. 12. Illustrates a PRIOR ART marine turbine.
Figure 13:
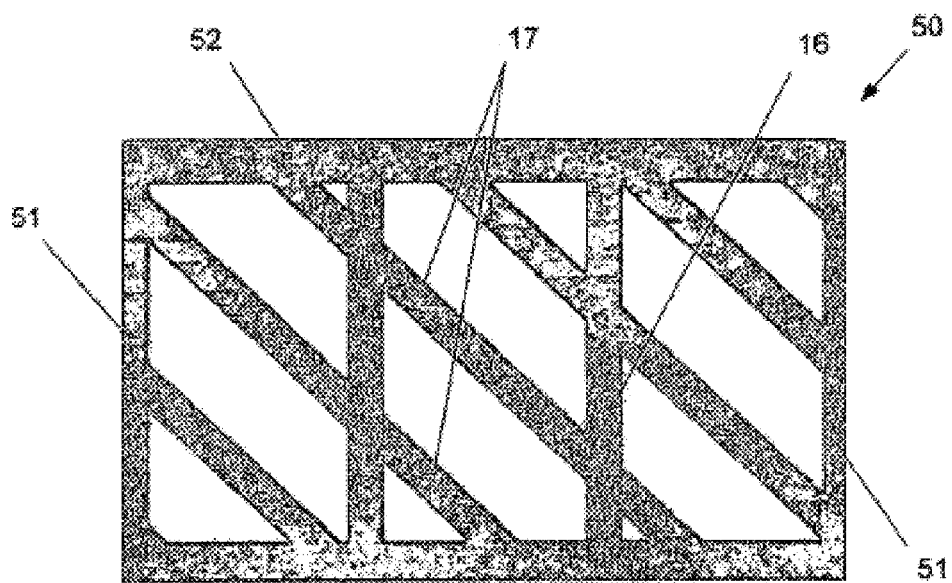
FIGS. 13-18. Illustrate part of the manufacture of the turbine.
Figure 14:
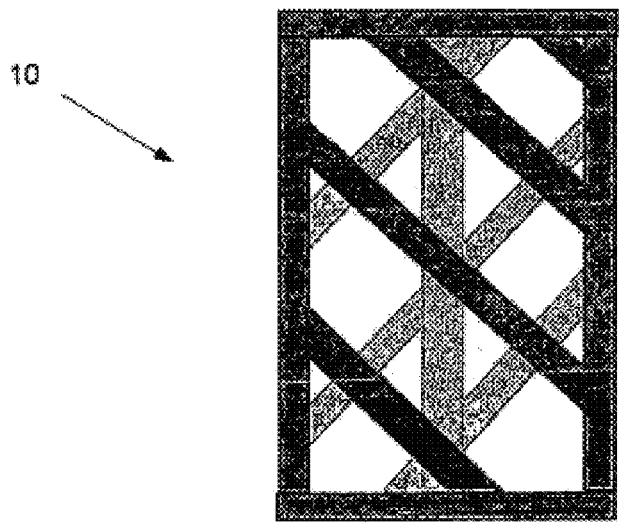

FIG. 10 illustrates a plan view of the combination of the permanent magnets 18 on the rotor rim and the windings 43 on the stator coil plate 48.

FIGS. 13-18 illustrate a method of being able to produce the crossflow turbine in a relatively low cost manner.

The turbines previously described are advantageously fabricated from a flat sheet 50 (see FIG. 13) cut out to desired turbine configurations allowing the use of comparatively low cost materials and more efficient methods of manufacture that reduce the capital and operational costs. The sheet materials 50 (plastics, metal etc.) are cut out to a template of helical 17 and straight vertical blade shapes 16 with top and bottom bands 52.

The turbine shapes are laser or hydro cut from a single sheet of structural material such as steel, plastics, composite fibre, laminates, Kevlar or other suitable strong lightweight sheet materials. The cut out shape is joined at its ends 51 (see FIG. 14) to form a cylinder that is suitably joined and fixed at the top and base, and which is the basis of the turbine 10 as illustrated in FIG. 1.

Figure 15:
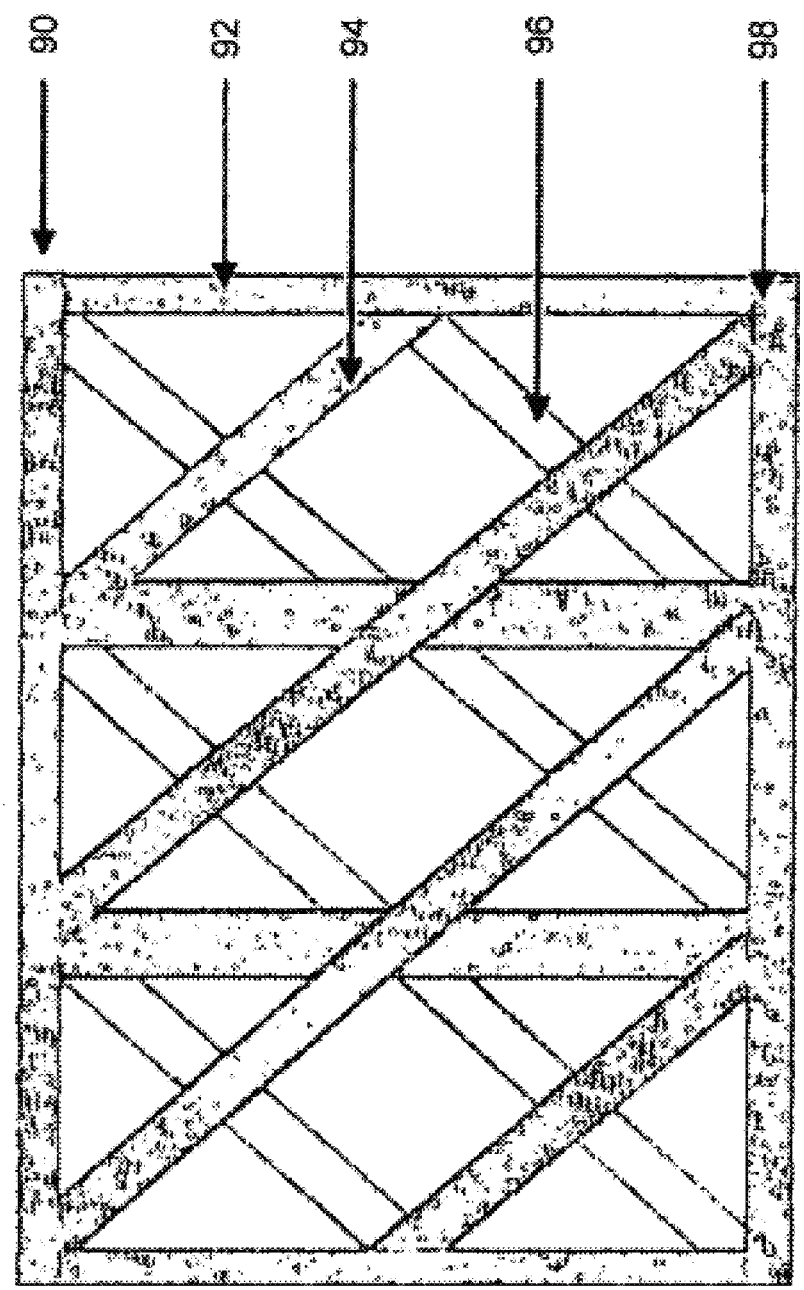

FIG. 15 illustrates the particular template which is cut, rolled then joined to form a cylindrical shape that is the basis of the turbine illustrated in FIG. 2. In FIG. 15 the item numbers indicate the following features as follows: Top rim band shape (90), vertical blade shapes (92), forward slanting blade shapes (94), rear slanting blade shapes (94), base rim band shape (96).

Figure 16:
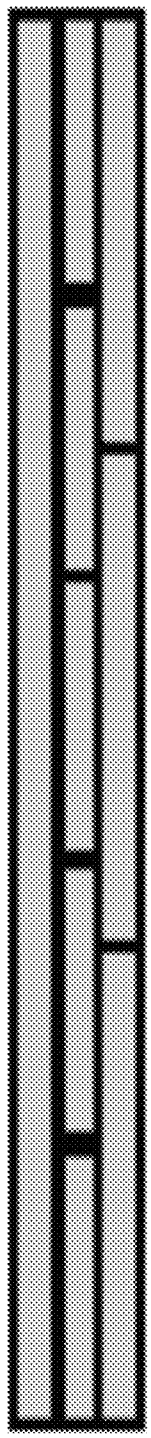

Pluralities of bendable laser cut sheets are laminated and fixed together to form an exceptionally strong and rigid cylinder that is the core of a turbine (see FIG. 16). Alternatively inner and outer laser cut sheets are rolled and fixed to spacer blocks that are sandwiched by the sheets that are suitably sealed at inner and outer perimeters.

Figure 17:
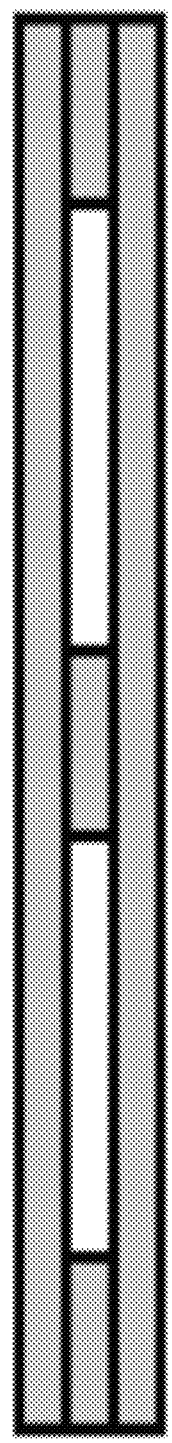

In this manner a space is formed between the sheets that advantageously allows the cylinder to be utilised as a one off mould that is filled with composite fibre and resin to form a strong and rigid cylinder that is the core of a turbine (see FIG. 17).

Figure 18:
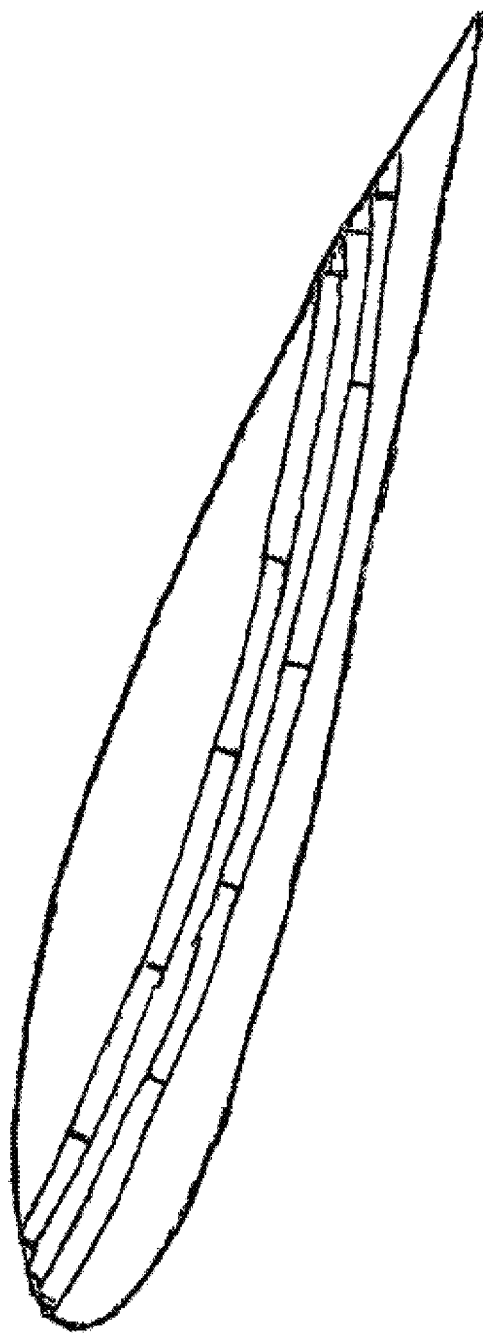
Figure 19:
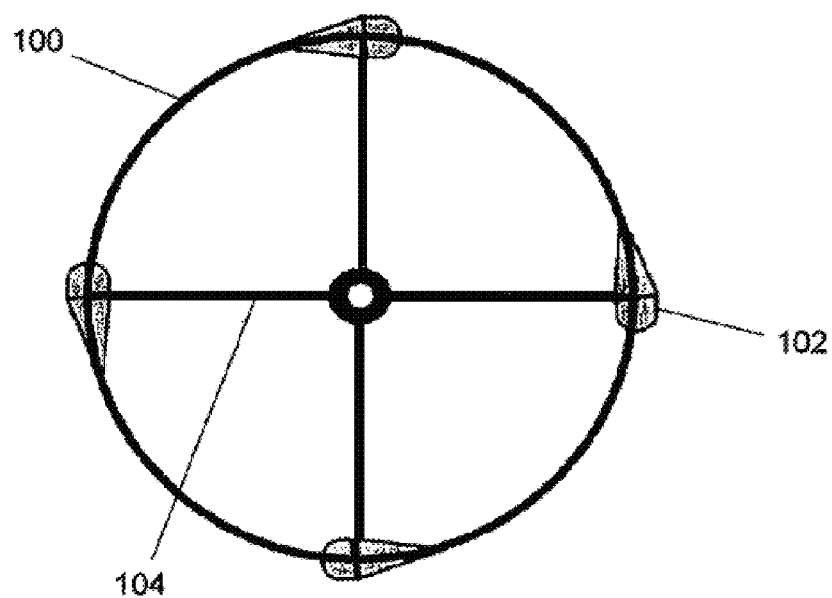
FIG. 19. Illustrates a plan view of a turbine cylinder with struts and attached aerofoils.

Laser cut aerofoil shapes cut from waste material left from cutting the cylinder shape is used to form the hydrofoil shapes that are suitably fixed to the blade shapes of the cylinder (see FIG. 18). FIG. 19 is a plan view of a turbine cylinder 100 with struts 104 and four aerofoils 102 of the type shown in FIG. 18 disposed around the cylinder.

Low cost extruded and/or injection, heat or vacuum moulded plastic, rubber or other suitable material components are also available for use as aerofoil shapes are fixed to the blade shapes of the cylinder.

Larger diameter turbines that require more than a single sheet of material are fabricated in a similar manufacture process save that the material is cut from a plurality of sheets to form a plurality of segments that when joined together comprise a cylinder shape that is suitably joined and laminated and or is composite fibre filled with hydrofoil shapes attached to form a turbine as previously described.

Cylinders fitted with aerofoil shapes and magnets are suitably fixed to a central shaft to be a cross flow turbine.

The bendable cut out sheet material is rolled and joined at the ends to form a cylinder shape that is reinforced. The rolled cylinders are fixed with additional layers of sheet material to increase strength and rigidity of the cylinder. The additional layers of material are laminated or otherwise suitably fixed to a cylinder.

The laminated or resin filled cylinder blade shapes can be fitted with aerofoil shapes.

National Advisory Committee for Aeronautics (NACA) aerofoil shapes or other suitable shapes are formed in one or more sections of a preferred shape that is suitably fixed to both sides of to the laminated blades of the cylinder. This method of turbine manufacture allows the use of low cost extruded, injection, heat or vacuum moulded or laser/hydro cut aerofoil shapes. Composite fibre moulded shapes may also be fixed to the blades.

The turbine with its plurality of vertical and helical blades at varying degrees of angle of attack advantageously provides opportunities to vary the hydrofoil shapes. Blade shapes can be varied to increase lift or drag as required and to smooth out rotations of the turbine. The solidities of the aerofoil blades can advantageously be varied within a turbine. Various shapes known to increase speed, torque or decrease shaking and or cavitation or assist in turbine self-start up can be used in combinations to provide optimum performance.

Figure 20:
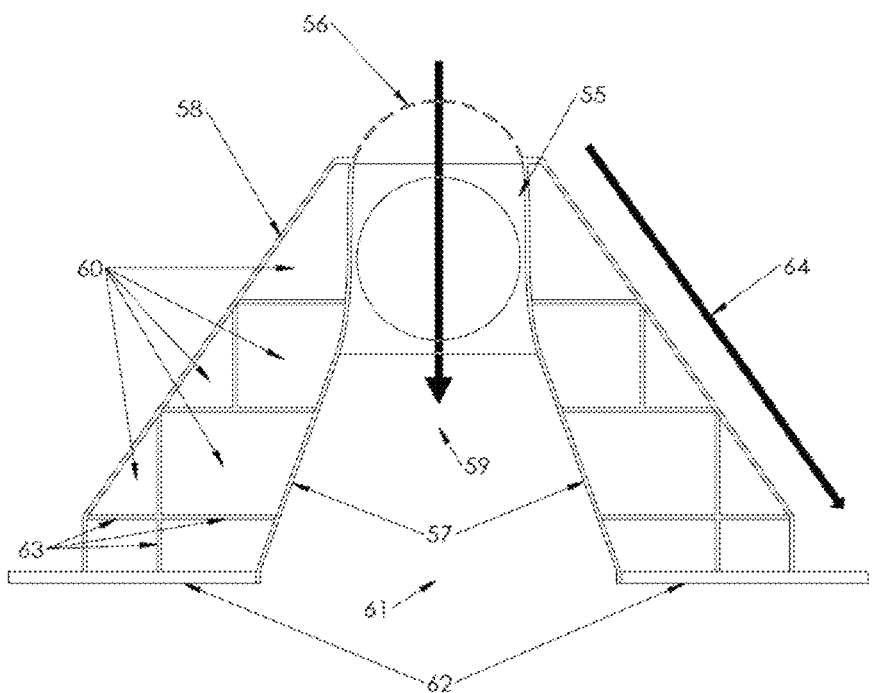
FIG. 20. Illustrates a structural duct apparatus.
Figure 21:
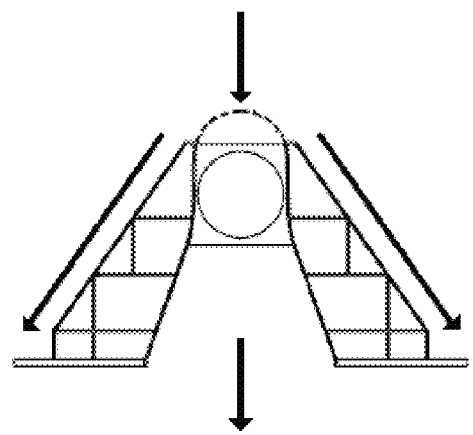
FIG. 21. Shows the apparatus of FIG. 20 and illustrates fluid flow thereabout.

FIGS. 20-25 illustrate a structural duct apparatus in which a turbine module can be housed. Referring initially to FIGS. 20 and 21, the apparatus 54 comprises a turbine power takeoff module 55 which can be inserted and removed from the apparatus. Some form of barrier screen 56 is provided in front of the module 55 to prevent ingress of solid debris that may damage the turbine.

The apparatus comprises an inner wall 57 and an outer wall 58 and has an inner flow passageway 59. The turbine module 55 is positioned in front of the apparatus and in the passageway 59 such that water flowing through the turbine module 55 passes into passageway 59.

Figure 22:
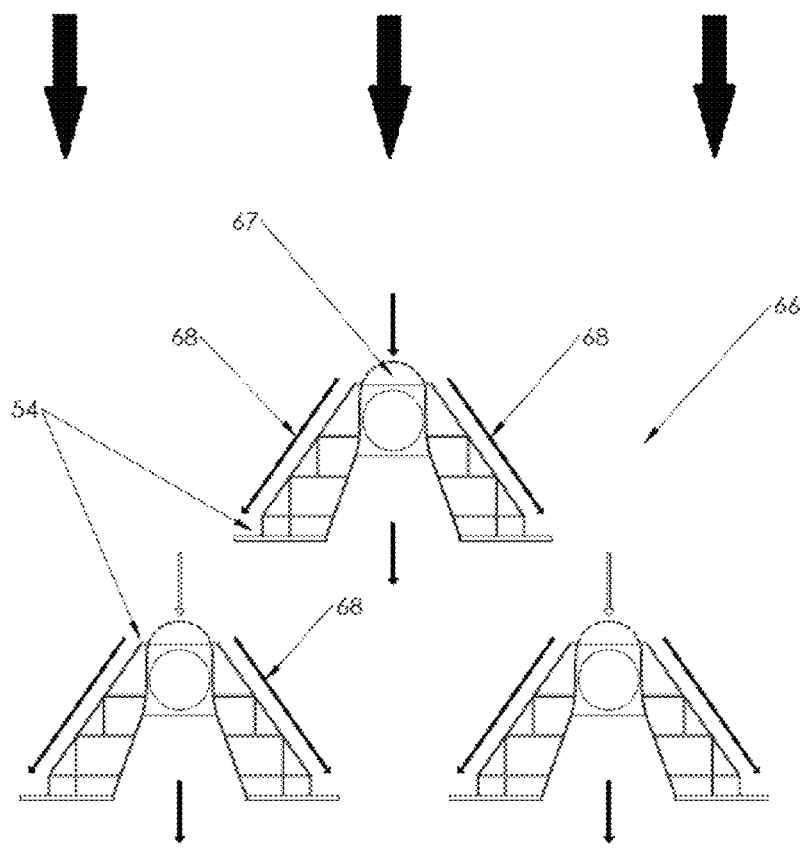
FIGS. 22-25. Illustrates duct arrays for single direction flows (e.g. a river flow).

The outer wall 58 of the apparatus influence flow direction so that with at least two ducts an open flow barrages is advantageously formed (see for instance FIG. 22).

The spaces between the inner and outer duct walls form ballast compartments 60 that also offer greater protection for the turbine power take off housed in the inner duct flow passage.

Passageway 59 functions as a diffuser that is wider at its outlet 61 so that the flows are augmented by a venturi effect. Rectangular end/side plates 62 join the two rear ends of the duct walls and protrude into flow at the sides of the duct to assist in lowering the pressure behind the turbine to potentially enhance performance.

The space between the inner and outer duct wall is reinforced with structural members 63 and the spaces between the inner and outer duct walls provide sealed compartments that operate as ballast tanks that can be filled with heavy weight materials to assist in anchoring the apparatus or filled with compressed air for buoyant operation as required.

The outer duct walls 58 advantageously obstruct flow and divert it (see arrow 64 in FIG. 20) so that it can be channeled as higher velocity flows to other downstream ducts.

The duct accommodates the cross flow turbine power take of module 55 that is docked into the apparatus and is suitably fixed so that it is easily installed and extracted as required. This arrangement advantageously allows for simple cost effective installation and module replacement in a maintenance cycle or in the event of a catastrophic failure. The duct apparatus 54 is comprised of an inner diffuser shaped flow path 59 with the turbine module installed at the narrow inlet.

The apparatus functions as a weighted device. The apparatus comprises an inner diffuser duct shrouded by an outer duct. The cavity between the ducts is used to provide ballast of heavy weight dense materials such as concrete, rock or sandbags that assists in mooring the device on the sea bed. The structural support members and a high strength material (steel plate, formed concrete etc.) outer duct increases the device's ability to withstand strong axial forces of currents and the harsh marine environment. This arrangement reduces costs of installation as the duct floats and can be towed to site. The duct can be loaded with ballast weights at site so that it is submerged into position. The duct can be connected to additional known gravity foundation moorings as required.

The apparatus can also function as a buoyant device, wherein the duct compartment is sealed to provide buoyant compartments that can be pumped by external pumps or compressors to fill the compartment with compressed air or water, sand or other suitable materials to achieve a desirable neutral depth in flow. The outer shroud provides greater structural integrity to the device so that it better survives the harsh marine environment.

A plurality of such apparatus (duct installations) 54 can be placed in an array to form open flow barrage arrays.

Duct installations 54 fabricated in heavy materials like concrete or other suitable materials that have a density greater than water are sufficiently weighted to allow the devices to be permanently positioned on the sea floor in arrays.

Such duct arrays remain on the ocean floor until such time as they are decommissioned. Only the interchangeable turbine power take off module is removed for maintenance or replacement as required over the lifecycle of the project.

Figure 23:
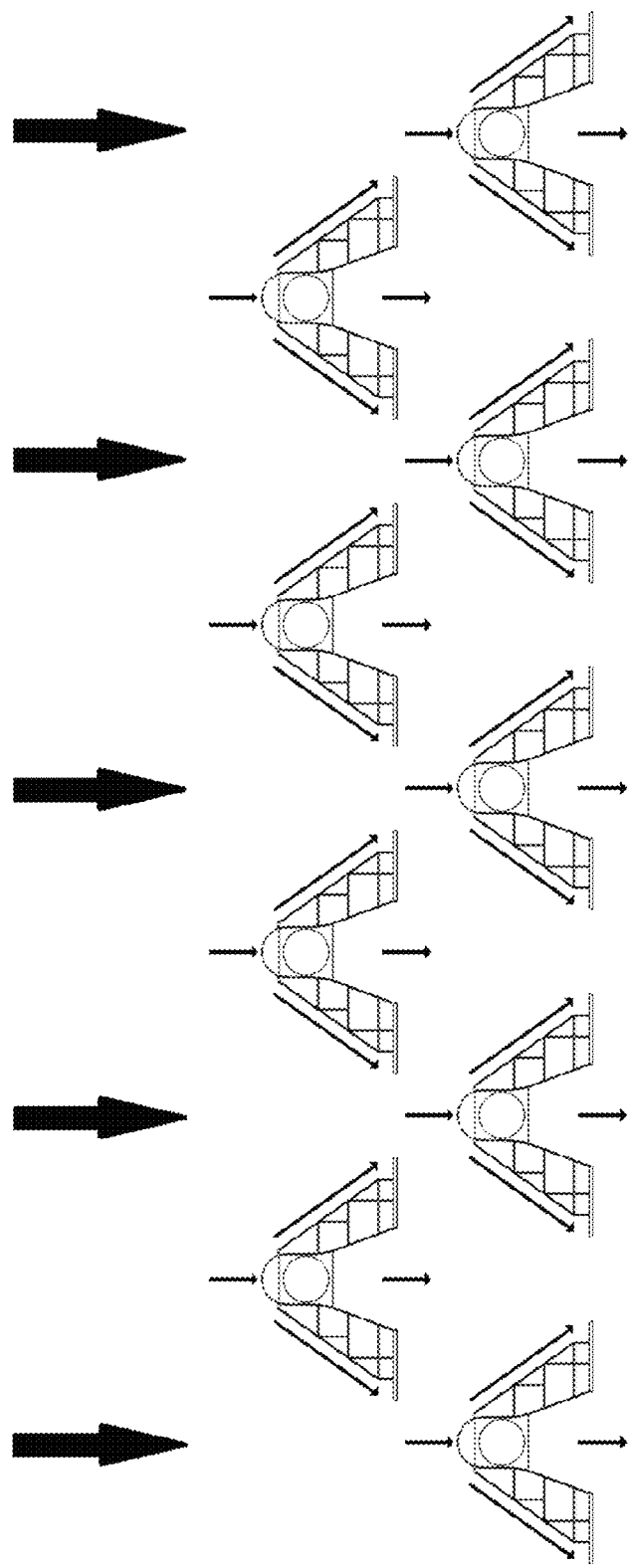
Figure 24:
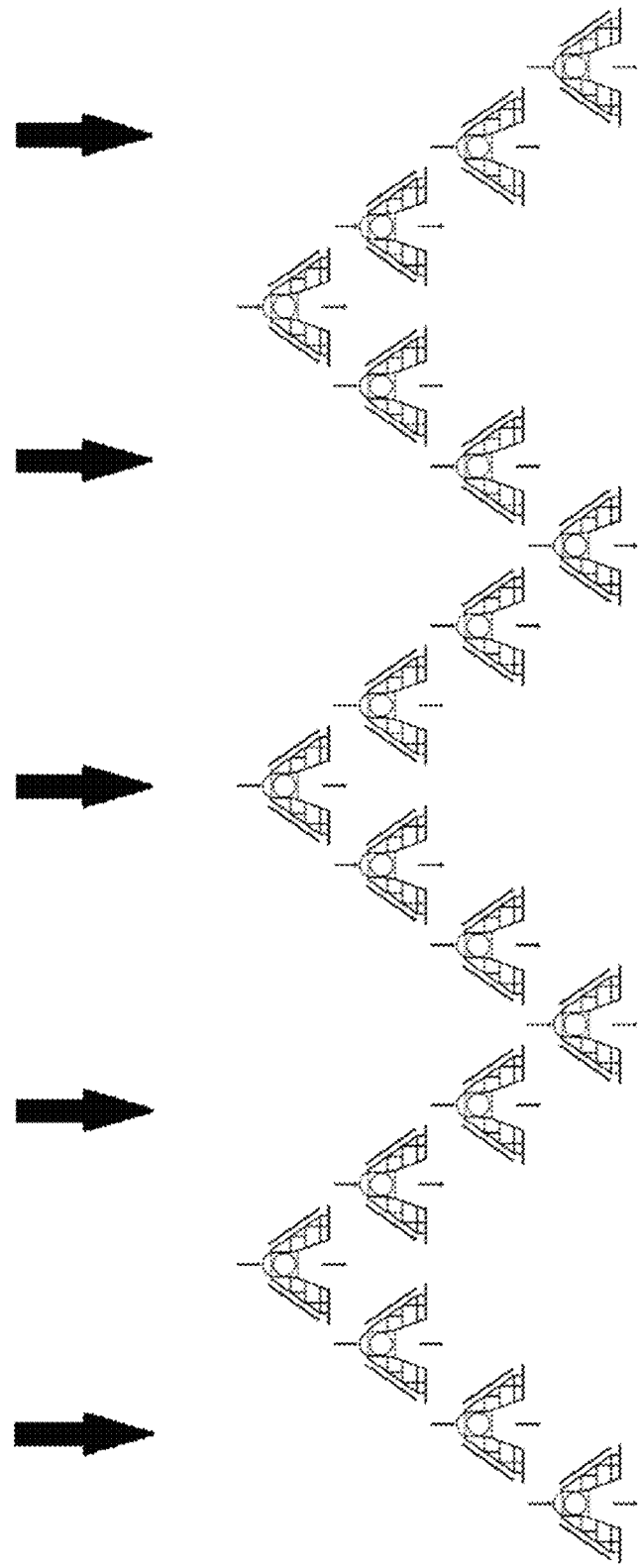

The exterior side walls of the compartment ducts deflect flows downstream. The deflected flows can be advantageously channeled to other downstream turbine ducts that are configured as arrays. Pluralities of weighted ducts 54 formed in arrays create an obstacle to flow so that the leading duct channels flows to the downstream ducts potentially increasing the velocity of flow. This is illustrated in FIG. 22, FIG. 23 and FIG. 24.

Successive rows of ducts create an efficient comparatively low cost energy extraction farm.

Referring specifically to FIG. 22, there is illustrated a duct array 66 comprising three duct apparatus 54, the array being suitable for single direction flows such as might be found in a river. Arrows indicate the direction of flows.

Fluid flows enter the turbine inlet 67 and flow across the turbine causing it to rotate and generate electricity. The outer duct wall deflects flows 68 along the outer surface that proceed downstream to other turbine ducts suitably positioned within the diverted flows.

The downstream ducts are positioned to allow flows to travel around the duct so that the obstacle flow that is the plurality of ducts does not choke or block flows but there are sufficient spacing or gaps to encourage flow between the ducts.

Array configurations of at least two or more turbine ducts creates an efficient open flow barrage for energy extraction from the flowing fluids.

FIGS. 23 and 24 illustrate more complex arrays of duct apparatus 54.

Figure 25:
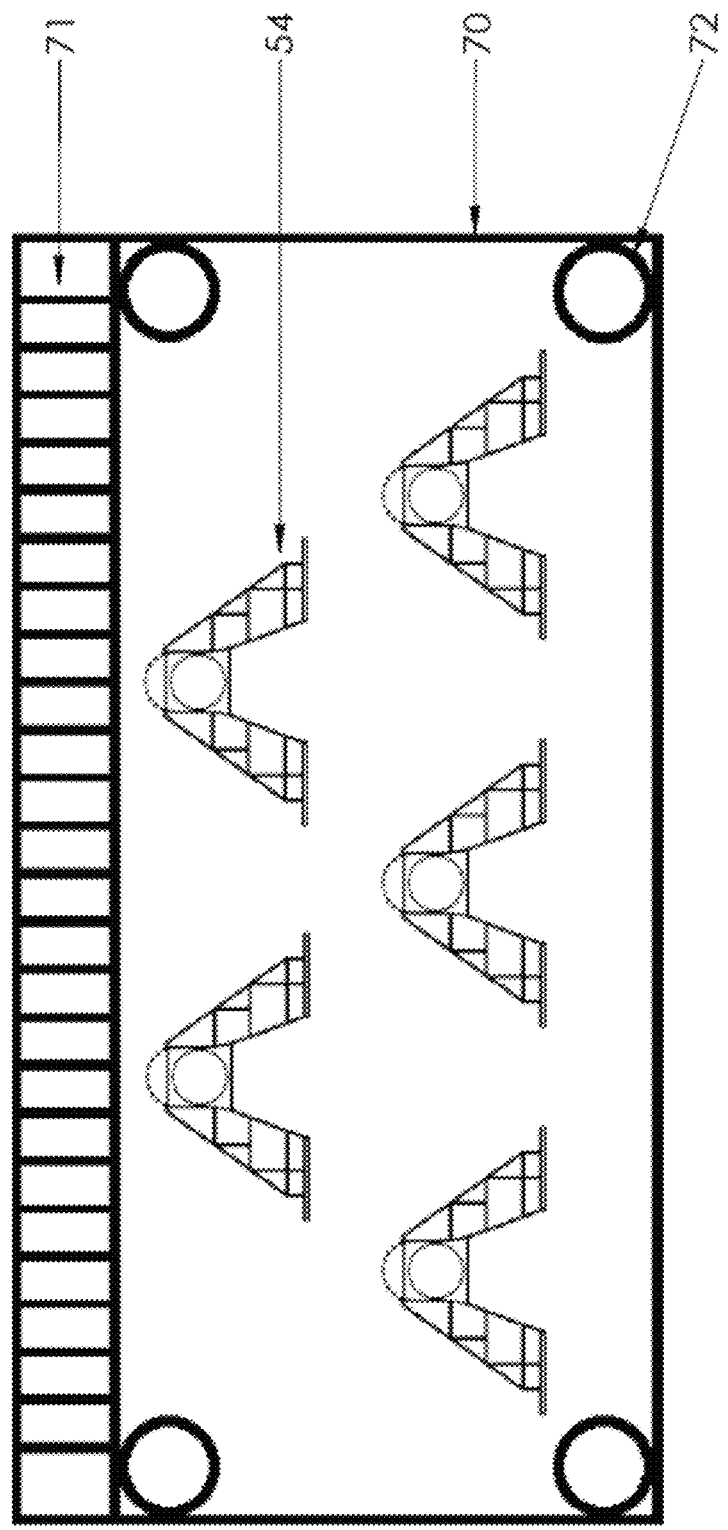

FIG. 25 illustrates a further embodiment of the invention which comprise pluralities of turbine duct apparatus 54 incorporated within debris screened 71 truss structure 70 to form a floating array. (Top plate omitted for clarity).

Pluralities of compartment ducts 54 can be fabricated from lightweight materials to form energy extraction arrays. The lightweight arrays of turbine ducts 54 are housed within a truss structure 70 that operates as a neutrally buoyant device tethered via eyelets 72 to a gravity weighted anchor (not illustrated), so that the structure yaws with changes in direction of flow or are fixed to a gravity weighted anchor, foundation, tiered support structures or other means of support.

Figure 26:
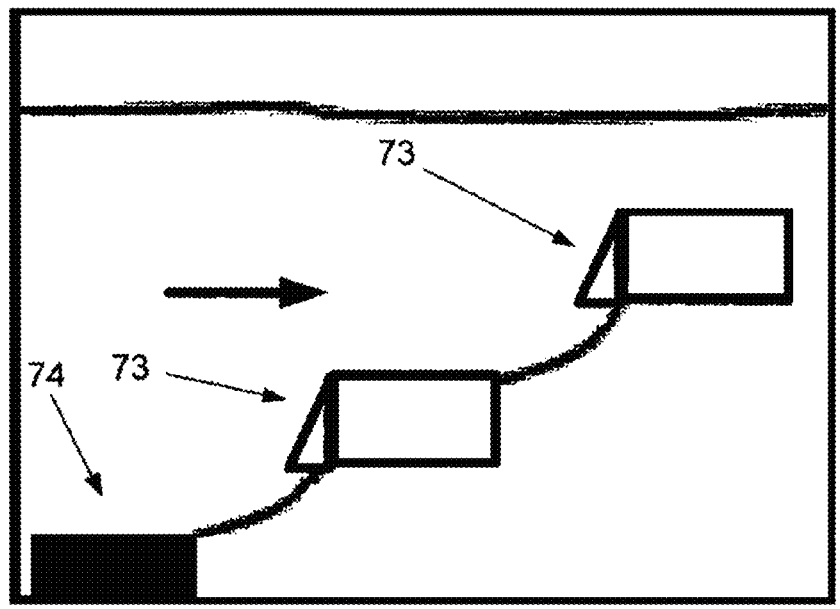
FIG. 26. Illustrates a floating duct array which can yaw with changing direction of flows.

FIG. 26 illustrates floating arrays 73 as described in FIG. 25 which are tethered to a gravity weighted mooring 74 to yaw with changing direction of flows.

Figure 27:
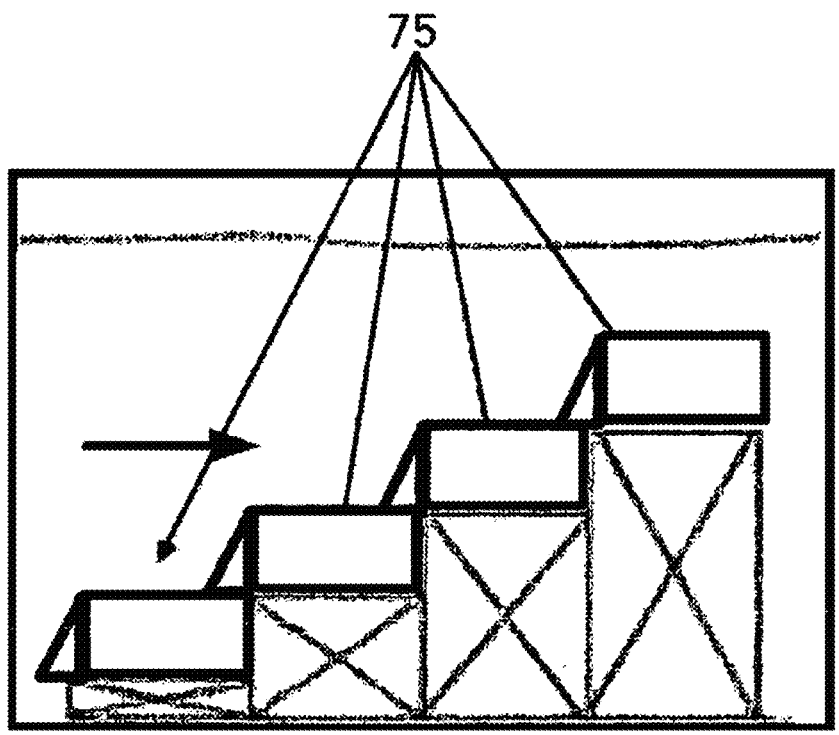
FIG. 27. Illustrates a fixed truss structure turbine array.

FIG. 27 illustrates truss structure turbine arrays fixed to known foundation moorings on the sea floor. The arrays may optionally be fixed to open tiered structures to capture energy within a flow at varying depths. Other known mounting and mooring systems suitable for neutrally buoyant devices are also applicable e.g. mounting under pontoons and other vessels and other known support devices.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A cross flow turbine for use in a fluid flow comprising at least one straight vertical aerofoil blade and at least one helical aerofoil blade slanted toward a direction of rotation, and at least one helical aerofoil blade slanted away from the direction of rotation, wherein the blades are connected with each other and located together on a same outer diameter of the turbine, and wherein the blades turn in unison in the direction of rotation.

2. The turbine as claimed in claim 1, wherein the turbine further includes top and bottom rim bands.

3. The turbine as claimed in claim 1, wherein the turbine further includes a central rotatable drive shaft.

4. The turbine as claimed in claim 1, wherein the turbine is operatively associated with a common drive shaft that is associated to a power take off for energy extraction.

5. The turbine as claimed in claim 1 further comprising external shafts.

6. An apparatus comprising a housing module, and a turbine, the turbine further comprising at least one straight vertical aerofoil blade and at least one helical aerofoil blade slanted toward a direction of rotation, and at least one helical aerofoil blade slanted away from the direction of rotation, wherein the blades are connected with each other and located together on a same outer diameter of the turbine, and wherein the blades turn in unison in the direction of rotation, and wherein part of the turbine comprises a rotor and part of the housing module comprises a stator such that a power take off comprises part of the apparatus.

7. The apparatus of claim 6, wherein the apparatus is a structural duct apparatus containing a turbine.

8. The apparatus of claim 7, comprising inner and outer walls to provide an inner diffuser flow passageway that can house turbine power take off modules with outer surfaces of the duct apparatus influencing flow direction so that where there are at least two ducts apparatuses an open flow barrage is advantageously formed.

9. The apparatus of claim 8, further including rectangular plates joining rear ends of the inner and outer walls and protruding into flow at sides of the duct apparatus to assist in lowering pressure behind the turbine for enhanced performance.

\* \* \* \* \*